Patented Sept. 9, 1952

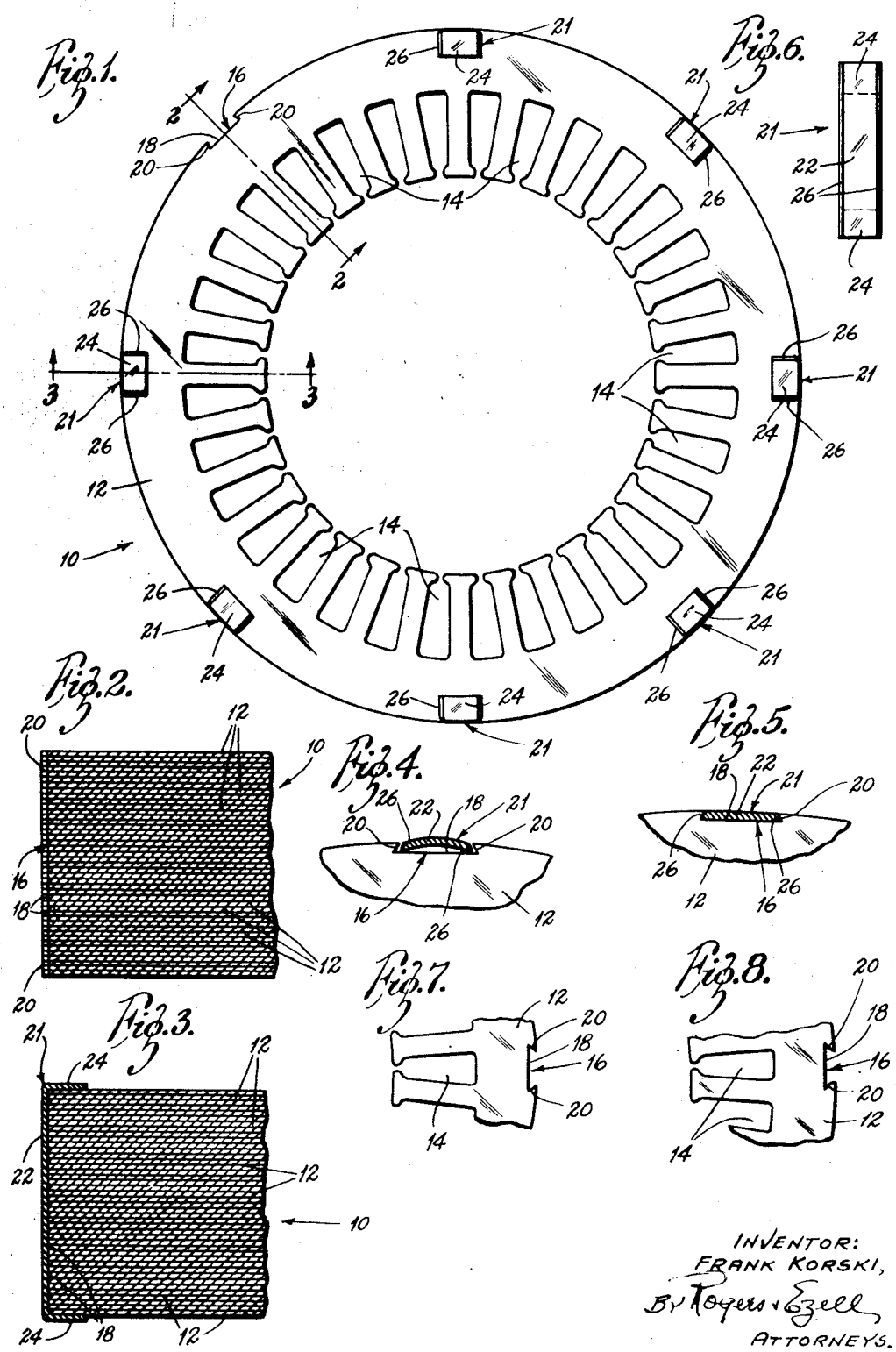

2,610,225

UNITED STATES PATENT OFFICE 2,610,225

CORE CONSTRUCTION FOR ELECTRICAL EQUIPMENT

Frank Korski, Maplewood, Mo., assignor to The Emerson Electric Manufacturing Company, St. Louis, Mo., a corporation of Missouri Application December 20, 1948, Serial No. 66,181

3 Claims. (Cl. 175—21)

1

The present invention relates generally to electrical equipment, and more particularly to a novel construction for holding together the sheetlike punchings or laminations employed as magnetic cores in said equipment.

At the present time, most of the equipment utilizing laminated cores have the laminations held together by means of rivets, welds, or the like. As is well known to those familiar in the art, the use of rivets results in relatively high eddy current losses due to the fact that the rivets are, of necessity, located where the flux density is relatively high; and, in addition, when the ends of the rivets are pressed inwardly in order to flatten them, the laminations are also pressed together, thereby causing the film of varnish, oxide, or scale on the surface of the lamina to break down so as to reduce the insulation between adjacent lamina.

It is an object of the present invention, therefore, to provide a novel construction for holding together the laminated cores used in electrical equipment which will reduce the eddy current loss below that found in equipment employing rivets as holding means.

Another object is to provide a holding construction which will not disturb the insulation on the surface of the laminae.

Another object is to provide a holding construction which can be used without the necessity of drastically altering the basic design or method of manufacture of the electrical equipment involved.

Another object is to provide a holding construction whereby each lamina is individually secured to the holding means.

Another object is to provide a holding construction which has a minimum number of parts and which is relatively inexpensive to manufacture.

Further objects and advantages of the present invention will be apparent from the following description, reference being had to the accompanying drawing wherein a preferred embodiment of the present invention is shown, in which:

Fig. 1 is the end view of the stator of a dynamo-electric machine embodying the teachings of the present invention, one of the keys being removed to show the shape of the grooves;

Fig. 2 is an enlarged fragmentary transverse sectional view taken on the line 2—2 of Fig. 1;

Fig. 3 is an enlarged fragmentary transverse sectional view taken on the line 3—3 of Fig. 1;

Fig. 4 is an enlarged fragmentary end view of a stator showing a key disposed in a groove prior to its being pressed into engagement with the laminations;

Fig. 5 is a view similar to Fig. 4, but showing the key after it has been pressed into engagement with the laminations;

Fig. 6 is a top plan view of a key prior to its being placed in a groove;

Fig. 7 shows one modification of the groove construction; and

Fig. 8 shows another modification of the groove construction.

By way of illustration, the invention is shown and will be described as applied to the stator of a dynamoelectric machine. It is to be understood, however, that the principles may be applied equally well to the rotors of dynamoelectric machines, the cores of transformers, and like equipment.

Referring to the drawing more particularly by reference numerals, 10 indicates generally the stator of a dynamoelectric machine embodying the teachings of the present invention. The stator comprises a series of sheet steel punchings or laminations 12 of the configuration shown in Fig. 1, which are disposed one on top of the other so as to form a short hollow column. The faces of the laminae 12 are normally covered with varnish, an oxide, or scale so as to form an insulated barrier between adjacent laminae.

The inner edges of the laminations 12 contain slots 14 for the insertion of conductors (not shown).

The outer edges of the laminations 12 are provided with a plurality of spaced shallow grooves 16 having a bottom wall 18 and side walls 20. As shown in Fig. 4, the side walls 20 are straight and converge outwardly, whereas, in the modified form shown in Fig. 7, the side walls are concave, and in Fig. 8 they are shown as convex. It has been found desirable to have the grooves located at the center of the coils (not shown), the conductors of which are disposed in the slots 14, because that is the area of minimum flux density.

Elongated keys 21 are disposed in the grooves 16 so as to hold together the laminations 12. The keys 21 include body portions 22 with end portions 24, and longitudinal edges 26, the latter being bevelled as shown in Figs. 4 and 5. Prior to assembly, the edges 26 are straight and the body portion 22 is slightly curved as shown in Fig. 4, the axis of curvature coinciding with the longitudinal axis of the key 21.

To engage a key 21 with the laminations 12, the stacked laminations are held together by means of clamps or the like, and the curved key is inserted in a groove 16 as shown in Fig. 4.

Pressure is then applied to the outermost surface of the key 21 so as to flatten it and cause the edges 26 to move laterally and become wedged against the side walls 20 of the grooves 16. This results in a holding engagement between the key and each lamina, thereby maintaining each lamina in what might be called minutely spaced relationship with the adjacent ones. Thus, the laminations are held together in close proximity without disturbing the insulating film or scale on their surfaces. Immediately after the keys 21 are flattened, the end portions 24 are bent contiguous with the outer surfaces of the end laminations, thereby preventing the outermost laminations from working loose due to the vibration of the equipment and the electromotive forces set up in the core.

The end portions 24 can be bent over with approximately one-third of the force necessary to flatten the ends of a rivet, and this force is not enough to disturb the locking engagement between the keys 21 and the individual laminae 12, nor to force the laminations together with such force as to establish relatively free eddy current paths between them.

The grooves 16 are formed in the laminations 12 in the original punching operation, and the cost of the keys 21 and the labor involved in inserting and flattening them is no more than that which results when rivets are used.

Thus it is apparent that there has been provided a holding construction which fulfills all of the objects and advantages set forth therefor. The keys are disposed in the edge of the stack of laminations where the flux density is relatively low. Also, the grooves or notches 16 cause deflection of the arcuate flux lines so that the keys themselves are not cut by the full number of lines of flux. As a result, the eddy current generation in the keys is minimized.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. In combination, a lamination stack having a plurality of sheet-like laminations laid contiguously face to face, the stack having an edge portion formed by the edges of a plurality of said laminations, a groove across the edge of said stack having laterally spaced, oppositely facing edges, and a thin sheet-like key in said slot to connect the laminations of the stack together, the key initially having a width less than the width of the slot, and initially having a cross section with an upstanding middle portion, the key in position having a width to force its edges laterally against the edges of the slot, and the middle portion of its cross section substantially flattened, to secure the laminations together.

2. The method of securing together the laminations of a core comprising the steps of providing a flat-bottomed, dovetail groove in an edge portion of the core, inserting a transversely arched keying member having bevelled edges in the groove, and flattening the keying member against the flat bottom of the groove so as to move the bevelled edges thereof into press-fitted engagement with the sides of the groove.

3. The method of securing together the laminations of a core comprising the steps of providing a flat-bottomed, dovetail groove in an edge portion of the core, inserting a transversely arched keying member having bevelled edges in the groove, flattening the keying member in the flat bottom of the groove so as to move the bevelled edges thereof into press-fitted engagement with the sides of the groove, and thereafter bending the ends of the keying member into contiguous relation with the sides of the core adjacent the ends of the groove.

FRANK KORSKI.

REFERENCES CITED

The following references are of record in the file of this patent:

UNITED STATES PATENTS

| Number | Name | Date |
|---|---|---|
| 383,567 | Fisher | May 29, 1888 |
| 880,429 | Treat | Feb. 25, 1908 |
| 1,375,699 | Ilg | Apr. 26, 1921 |
| 1,435,357 | Weber | Nov. 14, 1922 |
| 1,654,306 | Paszkowski | Dec. 27, 1927 |
| 1,820,531 | Engelhardt | Aug. 25, 1931 |

FOREIGN PATENTS

| Number | Country | Date |
|---|---|---|
| 23,868 | Great Britain | of 1914 |
| 318,895 | Great Britain | Sept. 10, 1929 |
| 372,726 | Great Britain | Oct. 31, 1930 |